(12) United States Patent
Ryhanen et al.

(10) Patent No.: US 8,791,800 B2
(45) Date of Patent: *Jul. 29, 2014

(54) DETECTING TOUCH INPUT AND GENERATING PERCEPTIBLE TOUCH STIMULUS

(75) Inventors: Tapani Ryhanen, Chesterton (GB); Piers Andrew, Cambridge (GB); Zoran Radivojevic, Cambridge (GB); Haque Samiul, Cambridgeshire (GB)

(73) Assignee: Nokia Corporation, Espoo (FI)

( * ) Notice: Subject to any disclaimer, the term of this patent is extended or adjusted under 35 U.S.C. 154(b) by 912 days.

This patent is subject to a terminal disclaimer.

(21) Appl. No.: 12/778,257

(22) Filed: May 12, 2010

(65) Prior Publication Data

US 2011/0279250 A1 Nov. 17, 2011

(51) Int. Cl.
*G06F 3/041* (2006.01)
(52) U.S. Cl.
USPC ........ 340/407.2; 178/18.03; 341/22; 345/173
(58) Field of Classification Search
USPC ................. 340/407.2; 341/22–34; 178/18.03; 345/156, 173
See application file for complete search history.

(56) References Cited

U.S. PATENT DOCUMENTS

| 4,020,328 | A | 4/1977 | Bradam | 235/146 |
|---|---|---|---|---|
| 5,181,030 | A | 1/1993 | Itaya et al. | 341/20 |
| 5,709,219 | A | 1/1998 | Chen et al. | 128/782 |
| 5,869,791 | A | 2/1999 | Young | 178/20.01 |
| 6,655,792 | B2 | 12/2003 | Benson et al. | 347/86 |
| 7,111,495 | B2 | 9/2006 | Rapp et al. | 73/24.01 |
| 7,176,903 | B2 | 2/2007 | Katsuki et al. | 345/173 |
| 7,221,981 | B2 | 5/2007 | Gliner | 607/116 |
| 7,385,443 | B1 * | 6/2008 | Denison | 330/9 |
| 8,626,283 | B1 | 1/2014 | Zhou | 607/3 |
| 2002/0022873 | A1 | 2/2002 | Erickson et al. | 607/117 |
| 2004/0095330 | A1 | 5/2004 | Ling et al. | 345/173 |
| 2004/0131998 | A1 | 7/2004 | Marom et al. | 434/236 |
| 2004/0207542 | A1 | 10/2004 | Chang et al. | 341/20 |
| 2005/0131490 | A1 | 6/2005 | Palanker | 607/57 |
| 2005/0187454 | A1 | 8/2005 | Gabl et al. | 600/372 |
| 2006/0061545 | A1 | 3/2006 | Hughes et al. | 345/156 |
| 2006/0085049 | A1 | 4/2006 | Cory et al. | 607/48 |
| 2006/0085056 | A1 | 4/2006 | Schouenborg | 607/148 |
| 2006/0149341 | A1 | 7/2006 | Palti | 607/63 |
| 2006/0241718 | A1 | 10/2006 | Tyler et al. | 607/45 |
| 2008/0157893 | A1 | 7/2008 | Krah | 331/177 R |

(Continued)

FOREIGN PATENT DOCUMENTS

DE  10 2009 020 769 B3  7/2010
EP      2 000 855 A1  12/2008

(Continued)

OTHER PUBLICATIONS

Kaczmarek, et al., "Polarity Effect in Electrovibration for Tactile Display", NIH Public Access. Author Manuscript, IEEE Trans Boimed, (Oct. 2006), (pp. 1-17).

(Continued)

*Primary Examiner* — Brent Swarthout
(74) *Attorney, Agent, or Firm* — Harrington & Smith

(57) ABSTRACT

An apparatus including a body portion having a surface; at least one feedback electrode configured to provide to a user a feedback stimulus when the user contacts the surface; and a touch sensor arrangement for discriminating different user contacts on the surface.

20 Claims, 8 Drawing Sheets

(56) References Cited

U.S. PATENT DOCUMENTS

| | | | |
|---|---|---|---|
| 2008/0255434 A1 | 10/2008 | Hayter et al. | 600/309 |
| 2009/0002328 A1 | 1/2009 | Ullrich et al. | 345/173 |
| 2009/0079550 A1* | 3/2009 | Makinen et al. | 340/407.2 |
| 2009/0085878 A1 | 4/2009 | Heubel et al. | 345/173 |
| 2009/0128503 A1 | 5/2009 | Grant et al. | 345/173 |
| 2009/0167704 A1 | 7/2009 | Terlizzi et al. | 345/173 |
| 2009/0174671 A1 | 7/2009 | Tachi et al. | 345/173 |
| 2009/0243632 A1 | 10/2009 | Ozawa | 324/679 |
| 2009/0293631 A1 | 12/2009 | Radivojevic | 73/774 |
| 2009/0322496 A1 | 12/2009 | Da Costa | 340/407.2 |
| 2010/0079403 A1 | 4/2010 | Lynch et al. | 345/174 |
| 2010/0085169 A1 | 4/2010 | Poupyrev et al. | 340/407.2 |
| 2010/0152794 A1 | 6/2010 | Radivojevic et al. | 607/2 |
| 2010/0231550 A1 | 9/2010 | Cruz-Hernandez et al. | |
| 2010/0265210 A1 | 10/2010 | Nakanishi et al. | 345/174 |
| 2011/0032088 A1 | 2/2011 | Kim et al. | 340/407.1 |
| 2011/0037707 A1* | 2/2011 | Radivojevic et al. | 345/173 |
| 2011/0079449 A1 | 4/2011 | Radivojevic | 178/18.03 |
| 2011/0127880 A1 | 6/2011 | Murphy et al. | 310/317 |
| 2011/0286156 A1* | 11/2011 | Beecher et al. | 361/679.01 |
| 2012/0038559 A1 | 2/2012 | Radivojevic et al. | 345/173 |
| 2012/0293441 A1* | 11/2012 | Eldering | 345/173 |

FOREIGN PATENT DOCUMENTS

| | | |
|---|---|---|
| JP | 2005/276089 A | 10/2005 |
| JP | 2008/532564 A | 8/2008 |
| WO | WO 87/07825 A1 | 12/1987 |
| WO | WO 2006/041648 A2 | 4/2006 |
| WO | WO 2007/010441 A2 | 4/2008 |
| WO | WO 2008/037275 A1 | 4/2008 |
| WO | WO 2009/037379 A1 | 3/2009 |
| WO | WO 2009/141502 A1 | 11/2009 |
| WO | WO 2009/158074 A1 | 12/2009 |
| WO | WO 2010/066817 A2 | 6/2010 |

OTHER PUBLICATIONS

Yamamoto, et al., "Electrostatic Tactile Display with Thin Film Slider and Its Application to Tactile Telepresentation Systems", IEEE Transactions on Visualization and Computer Graphics, vol. 12, No. 2, (Mar./Apr. 2009), (pp. 168-177), XP003026562.

"Capacitively Coupled Electromagnetic Field Therapy as a Treatment Modality in Veterinary Medicine" http://www.scitechvet.com/articles.html, retrieved Dec. 30, 2008.

"Induced Current Constraints and Capacitive Effects in Inductive Nerve Stimulation"—McCarthy S, Haradem D, IEEE Transactions on Biomedical Engineering, vol. 37, Issue 6, Jun. 1990, pp. 598-605, http://ncbi.nlm.nih.gov/pubmed/2354841.

"Noninvasive Neuroelectronic Interfacing with Synaptically Connected Snail Neurons Immobilized on a Semiconductor Chip", Gunther Zeck, Peter Fromherz, PNAS Aug. 28, 2001 vol. 98 No. 18 10457-10462, http://www.pnas.org/content/98/18/10457.full.pdf+html.

"Capacitive Stimulatory Effect in Magnetic Stimulation of Nerve Tissue" Ueno S. Matsumoto S, Harada K, Oomura Y, IEEE Transactions on Magnetics, vol. 14, Issue5, Sep. 1978 pp. 958-960, http://ieeexplore.ieee.org/stamp/jsp?arnumber=01059800.

http://venturebeat.com/2008/05/30/startup-senseg-promises-game-changing-tactile-technology/—retrieved Jan. 12, 2009.

Peter B. L. Meijer, "Augmented Reality for the Totally Blind", Nov. 2010, (4 pages).

Karim Nice, Tracy V. Wilson and Gerald Gurevich; *How Digital Cameras Work*; Nov. 29, 2006. Howstuffworks.com. http://electronics.howstuffworks.com/cameras-photography/digital/digital-camera2.htm/printable Feb. 19, 2013, p. 1-6.

Bao, Oliver et al., "Teslatouch: Electrovibration for Touch Surfaces", (Oct. 4, 2010), (10 pages).

"Series E: Overall Network Operation, Telephone Service, Service Operation and Human Factors", ITU-T Recommendation E.161, Telecommunication Standardization Sector of ITU, Feb. 2001, 14 pgs.

http://www.nokia.com/about-nokia/research/demos/the-morph-concept; "Develop for Lumia", Feb. 25, 2014, 9 pgs.

* cited by examiner

DETECTING TOUCH INPUT AND GENERATING PERCEPTIBLE TOUCH STIMULUS

FIELD OF THE INVENTION

Embodiments of the present invention relate to haptics and providing a device that can detect touch input but also generate perceptible touch stimulus.

BACKGROUND TO THE INVENTION

Electromechanical actuators, such as vibrators, are currently used to create a touch stimulus. However, they have a number of drawbacks.

BRIEF DESCRIPTION OF VARIOUS EMBODIMENTS OF THE INVENTION

According to various, but not necessarily all, embodiments of the invention there is provided an apparatus comprising: a body portion having a surface; at least one feedback electrode configured to provide to a user a feedback stimulus when the user contacts the surface; and a touch sensor arrangement for discriminating different user contacts on the surface.

According to various, but not necessarily all, embodiments of the invention there is provided a flexible apparatus comprising: an exterior touch surface for touching by a user; means for discriminating different touches on the exterior touch surface by a user; and electronic means for providing tactile feedback to a user when the user touches the exterior touch surface.

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EMBODIMENTS OF THE INVENTION

Figure 1A:
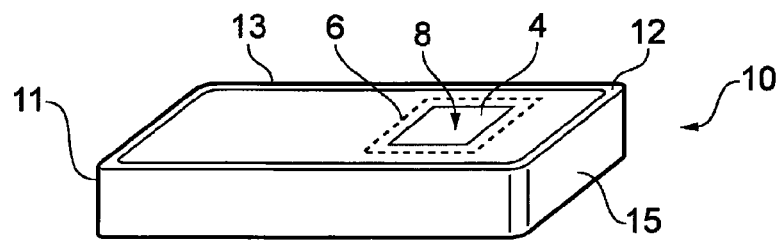
FIG. 1A schematically illustrates an example of an apparatus from a top, side perspective.

The Figures schematically illustrate an apparatus 10 comprising: a body portion 11 having a surface 12; at least one feedback electrode 4 configured to provide to a user a feedback stimulus where the user contacts the surface; and a touch sensor arrangement 6 for discriminating different user contacts on the surface 12.

In some embodiments the touch sensor arrangement 6 may measure input parameters such as a location of a contact and/or a speed at which a contact location on the surface 12 travels and/or a pressure applied by at the contact location and/or the extent of deformation caused by the user contact and/or a contact (skin) impedance (Zc) at the contact location. The feedback stimulus provided at the contact location may be dependent upon one or more of these discriminating input parameters.

In some embodiments the apparatus 10 or parts of the apparatus 10 may be deformable by a user, for example all or part of the surface 12 may be deformable (including but not limited to compressibility, stretchability, flexibility, three-dimensional deformation). In addition the feedback electrode and the touch sensor arrangement may form a transparent deformable multi-layer structure.

In some embodiments, the apparatus 10 may comprise a display 8 underlying the feedback electrode and the touch sensor arrangement. In these embodiments, each of the feedback electrode and the touch sensor arrangement are transparent so that the display can be viewed.

The feedback electrode 4 may provide an 'electrically modulated moving touch stimulus' (EMMTS).

'Electrically Modulated Moving Touch Stimulus' (EMMTS)

The body portion 11 may also have a surface electrode 2 on the surface 12 spaced from the feedback electrode 4. A controller 30 may be configured to apply a time varying potential difference 24 between the surface electrode 2 and the feedback electrode 4.

In use, a user 40 (e.g. FIG. 5) holds the apparatus 10 in one hand or two hands or otherwise contacts the apparatus 10 using two different body portions. One portion of the user's body contacts the surface electrode 2 and another portion of the user's body (typically a digit) contacts a feedback electrode 4. The two points of contact close an electric circuit through the user's body. 2. The feedback electrode 4 has an associated time varying electric field that varies with the applied time varying potential difference. The electric field produces a time-varying force that does not directly create a touch stimulus at an overlying and touching digit of a user when the digit is stationary but does provide a touch stimulus indirectly when the digit of the user, while in contact with the feedback electrode 4, is traced over the feedback electrode 4. It is believed that the time varying force modulates the frictional force applied to the touching digit, which creates a modulating shear force at the surface of the digit when the digit is traced over the feedback electrode 4. The time varying touch stimulus perceived by the user as the digit is traced over the feedback electrode 4 creates a perceived 'texture' that can be modified by controlling the time variation of the applied potential difference When a user touches the feedback electrode 4 the touching conditions are discriminated by input parameters including the applied pressure, the contact surface area between the touching digit and the feedback electrode 4 and other interface contact parameters such as, for example, a contact impedance (Zc), a speed at which a touch position on the surface 12 travels, an extent of deformation caused by the touch. The input parameters including the contact impedance Zc can be measured in real time. The time varying electric field associated with the feedback electrode 4 can be dynamically adjusted according to the current, real touching conditions as characterized by the input parameters.

In this document the term 'electrically modulated moving touch stimulus' (EMMTS) will denote a touch stimulus at a user's body part that is controlled using an apparatus to apply a time varying potential difference and that is perceptible to a user when there is relative motion between the body part and the apparatus while there is touch contact between the body part and the apparatus but is not perceptible to a user when there is not relative motion between the body part and the apparatus while there is touch contact between the body part and the apparatus.

The current that flows as a consequence of the applied time varying potential difference is typically less that 10 µA which is less that the current required for direct activation of nerves or muscle.

EMMTS may therefore be viewed as electrically modulating (using the time varying potential difference) a nerve stimulation created by an alternative method (e.g. dragging a digit over a surface).

Figure 1B:
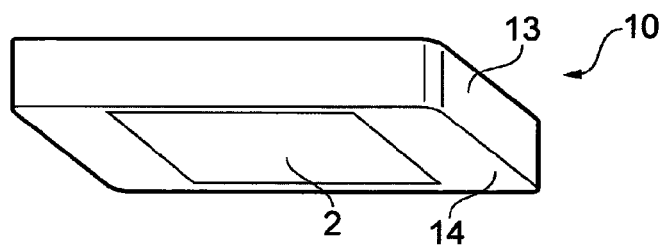
FIG. 1B schematically illustrates the example of the apparatus from a bottom, side perspective.

FIG. 1A schematically illustrates an example of an apparatus 10 from a top, side perspective and FIG. 1B schematically illustrates the example of the apparatus from a bottom, side perspective.

The apparatus 10 comprises a body 11. The body 11 is typically flexible and provides shape to the apparatus 10. The body 11 has an exterior surface 12 that defines the exterior surface area of the body 11.

In the illustrated example, but not necessarily in all examples, the surface 12 provides a front face 13, a rear face 14 and side faces 15. The faces in this example define an interior volume that may house electronic components such as the controller 30.

The front face 13, in this example, presents a feedback electrode 4 over which a digit of a user is moved during EMMTS for that electrode. It may also comprise additional feedback electrodes over which a digit of a user is moved during EMMTS for that electrode.

The feedback electrodes 4 are exposed at the front face 13 for touch contact. As described in more detail below, the feedback electrodes 4 may comprise a conductive layer covered by an appropriate dielectric layer, which is typically optically transparent. Therefore although the electrode is exposed at the front face 13 the conductive layer is not necessarily exposed.

The electrode 4 may have multipurpose functionality. As described in more detail below, besides the functionality of providing the EMMTS feedback it may also provide touch contact impedance measurements (Zc).

The feedback electrodes 4 are, in this example, each in register with a smooth portion of the surface 12 of the front face 13. Smooth in this context means that the surface 12 has a substantially uniform coefficient of friction across the smooth portion. The coefficient of friction may also be low. The substantially uniform coefficient of friction ensures that changes in the frictional force applied to a moving digit that is in contact with the smooth portion of the surface 12 is predominantly as a result of the electric modulation applied to the feedback electrode 4. The whole of the surface 12 may be smooth and the smooth portions associated with the feedback electrodes do not necessarily have to be physically different from other portions of the surface 12.

The feedback electrode 4 needs to extend in at least one direction a distance that is sufficient to allow a digit of a user to be physically traced in that direction. The extension of the feedback electrode 4 in that direction is sufficient, bearing in mind the rate at which the time varying potential vary in time, to allow a user to trace their digit over the feedback electrode at a reasonable rate and be able to feel the modulations. If periodic modulations are used, it may be necessary to have greater extension for lower frequency ranges. The extension is sized and the time variation of the potential difference is controlled to provide to a digit of a user that is traced across the feedback electrode a time varying touch stimulus.

The rear face 14 is a face of the apparatus 2 that presents a rear surface electrode 2 which is used to close the electrical circuits created by any of the feedback electrodes 4. The rear surface electrode 2 may be a common reference electrode connected to a ground or earth 34 of the apparatus.

Figure 5:
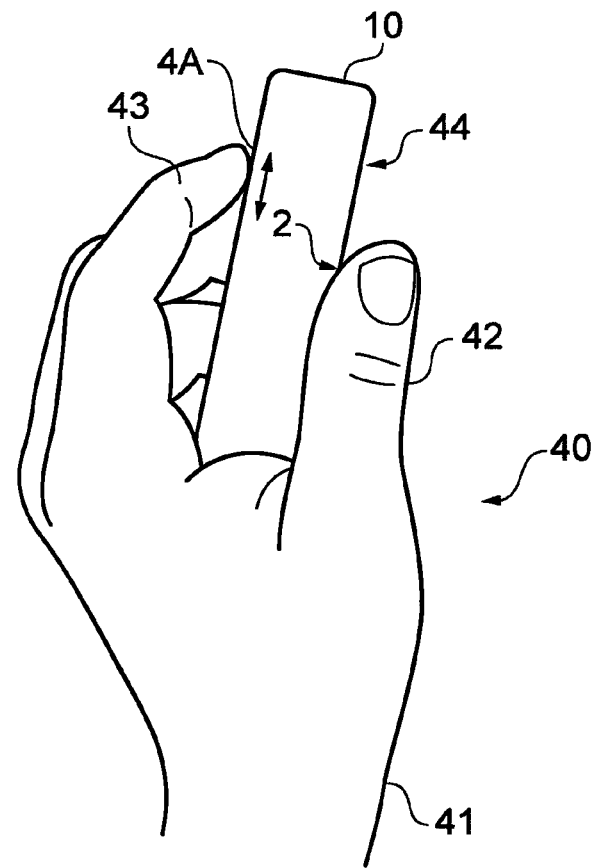
FIG. 5 schematically illustrates use of one example apparatus

The grounding surface electrode 2 may be sized and positioned to be touched by a user when the apparatus 10 is held in a user's hand as illustrated in FIG. 5.

Figure 2:
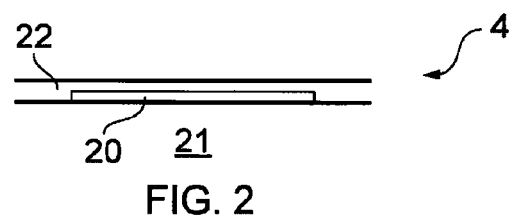
FIG. 2 schematically illustrates a cross-section though an example of a surface electrode.

FIG. 2 schematically illustrates a cross-section though an example of a surface electrode. The illustrated electrode may be used as a feedback electrode 4 or, separately, as a grounding electrode 2.

In this example, the surface electrode comprises a conductive layer 20 that overlies a substrate 21 and a dielectric layer 22 that overlies the conductive layer 20. The dielectric layer 22 insulates the conductive layer 20 creating an 'insulated' surface electrode. Consequently, when a user touches the surface electrode there is no galvanic connection between the conductive later 20 and the user.

The substrate 21 may be any arbitrary substrate that will support the conductive layer 20. In some embodiments it may be flexible in other embodiments it may be the body 11 of the apparatus 10.

The conductive layer 20 may be formed from any suitable conducting material. It may, for example, be formed from metal such as aluminum (Al), Copper (Cu), gold (Au) thin films or coatings made by carbon nano tubes (CNT) or silver nano wires, etc. It may for example be indium-tin-oxide (ITO). It may also be formed from graphene. In some embodiments, the material and thickness of the conductive layer may be chose so that it is substantially optically transparent and the body 11 of the apparatus 10, which acts as substrate 21, can viewed through it.

The dielectric layer 22 may be a dielectric layer with a high relative permittivity such as Hafnium oxide ($HfO_2$), aluminum oxide ($Al_2O_3$) and titanium oxide ($TiO_2$). It may also be formed from a dielectric with a low relative permittivity. The dielectric layer may provide a hard surface for contact with a user's digit. The surface of the dielectric layer 22 can range from smooth to rough. The surface profile can be controlled by having mechanically introduced ridges and mechanical cavities or patterns. Periodicity of such patterns including the height of the cavities and ridges may be in range of 1-100 µm.

The dielectric layer 22 may in some embodiments be optically transparent.

The combination of the first conductive layer 20, the dielectric layer 22 and the substrate 21 (if present) may be flexible.

Although the grounding electrode 2 may be formed as an insulated surface electrode as illustrated in FIG. 2, in other embodiments it is formed as a galvanic surface electrode. A galvanic surface electrode is a surface electrode that has an exposed conductive layer (no dielectric covering) so that when a user touches the exposed surface electrode there is a galvanic connection between the conductive later and the user.

A feedback electrode 4 should not make a galvanic connection to a user as this will significantly reduce the potential difference between the feedback electrode 4 and the user which is used for EMMTS.

In the example illustrated in FIG. 2, the feedback electrode 4 is an insulated surface electrode. The insulation allows an electrostatic potential to build-up.

Figure 4:
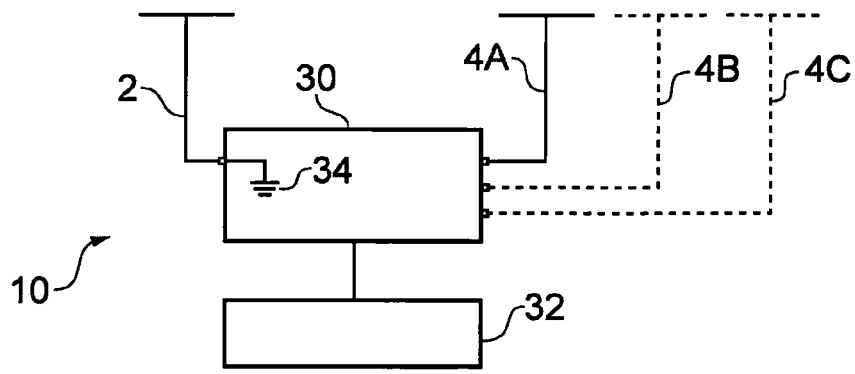
FIG. 4 schematically illustrates an example of functional components of the apparatus.

FIG. 4 schematically illustrates an example of some functional components of an apparatus 10.

The apparatus 10 comprises one or more feedback electrodes 4A, 4B, 4C, a controller 30, an energy source 32 and a grounding electrode 2 connected to a reference ground or earth 32.

The controller 30 is configured to apply a time varying potential difference between a (or each) feedback electrode 4A, 4B, 4C and the grounding surface electrode 2.

Figure 3A:
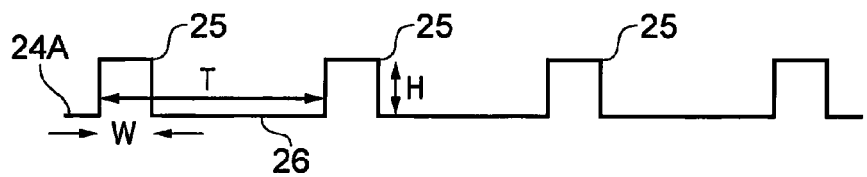
FIG. 3A schematically illustrates an example of a first applied periodic potential difference.
Figure 3B:
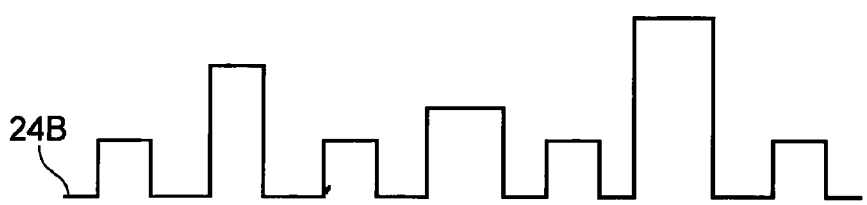
FIG. 3B schematically illustrates an example of a second applied periodic potential difference.

The controller 30 is also configured to control the time variation in the potential difference The controller 30 may, for example, controllably vary one or more of an amplitude (H), a width (W) and a periodicity (T) of an applied pulse train potential difference as illustrated in FIGS. 3A and 3B. The system operates in a regime which is using 1-100 µA. When the controller 30 is applying a time varying potential difference to enable EMMTS the electric current flow via the surface electrode may be controlled so that it does not exceed 100 µA.

If the controller 30 is configured to apply a time varying potential difference to multiple feedback electrodes 4A, 4B, 4C, then it may be configured to provide a different time varying potential difference to each of the multiple feedback electrodes 4. It may also be configured to individually and independently control at least the time variations in the different potential differences.

As the power consumption of the controller 30 is low when enabling EMMTS because of the very low electric current flow, it is possible to have EMMTS always enabled. The controller 30 is then configured to continuously apply a time varying potential difference between the feedback electrode(s) 4 and the grounding surface electrode 2 when the apparatus 10 is switched on or if desired even when the device is switch off.

FIGS. 3A and 3B schematically illustrates examples of a time varying potential difference that could be applied by the controller 30. FIG. 3A schematically illustrates an example of a first applied periodic potential difference 24A and FIG. 3B schematically illustrates an example of a second applied periodic potential difference 24B.

The controller 30 may be configured to measure input parameters, as described above, in real time and dynamically adjust the applied pulsed train potential difference. The controller 30 may, for example, controllably vary one or more of an amplitude (H), a width (W) and a periodicity (T) of an applied pulsed train potential difference.

In the illustrated example, the potential difference 24A is a series of regular top-hat pulses separated by regular periods T including gaps 26. Each pulse can be characterized by its height H and its width W. The train of pulses can be characterized by {H, W, T}. The controller 30 may for example control the time variation in the potential difference by controlling one or more of H, W, T. The train of pulses can then be characterized by {H(t), W(t), T(t)}, where H(t) indicates time variation of the pulse height, W(t) indicates time variation of the pulse width and T(t) indicates time variation of the pulse period.

In other implementations, the potential difference may be a sinusoid signal which is then characterized by {H(t), T(t)}.

It is believed that it is the change in electric field/frictional force generated by the potential difference that has most effect on user perception. Therefore, top-hat pulses as illustrated in FIGS. 3A and 3B may be preferred because of the rapid increase in potential difference creates an impulse modulation that is easily perceived using EMMTS. Furthermore, the time difference between the impulses creates a periodic surface 'texture' that is dependent upon the period T(t) and the speed of movement of a user's digit. The controller 30 by time modulating T(t) can therefore convey information to a user using EMMTS.

Touch Sensor Arrangement

Figure 7:
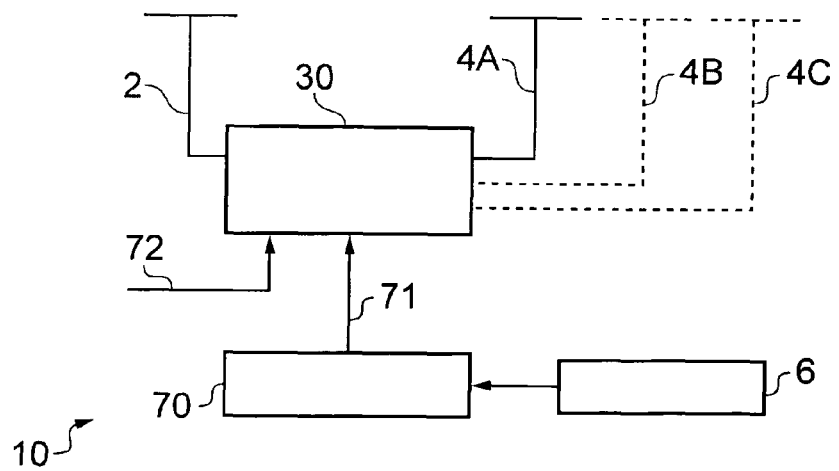
FIG. 7 schematically illustrates components of the apparatus that control touch stimulus.
Figure 8:
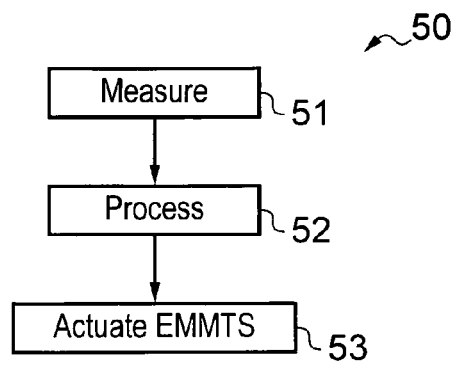
FIG. 8 schematically illustrates a method for controlling touch stimulus.

FIG. 8 schematically illustrates a method 50 for controlling touch stimulus. The method 50 comprises a measurement block 51, followed by a processing block 52, followed by a touch stimulus application block 53. FIG. 7 schematically illustrates components of an example of an apparatus that control touch stimulus according to the method 50.

As illustrated in FIG. 7, the apparatus 10 comprises a touch sensor arrangement 6 for performing measurements; a detector 70 for detecting measurements made at the touch sensor arrangement 6 and parameterizing those measurements; a controller 30 that processes the input parameters provided by the detector 70 to provide a feedback control signal (time varying potential difference to feedback electrode(s) 4) for controlling a EMMTS feedback stimulus to a user.

The touch sensor arrangement 6 is used to discriminate different touch inputs made at the surface 12 of the apparatus. Touch inputs may, for example, be discriminated using the touch sensor arrangement 6 by measuring input parameters such as position (X,Y) of the actual touch, and/or by the amount of force applied and/or the area over which the force is applied and/or by the contact impedance (Zc) and/or by a speed at which a touch position on the surface 12 travels In this example, the detector 70 provides a measurement input 71 to the controller 30. The measurement input may, for example, identify a position on the surface 12 that has been touched and/or a speed at which a touch position on the surface 12 travels and/or the pressure applied by a touch and/or the extent of deformation caused by the touch or touches and/or a contact (skin) impedance (Zc) and/or an area that has been touched.

The detector 70 may also provide the input 71 to other processing circuitry that controls the user interface. For example, touching the surface 12 of the apparatus 10 at different locations may enable the apparatus 10 to be controlled in different ways or for different input commands to be provided to the apparatus 10.

The controller 30 is configured to provide a feedback control signal (time varying potential difference to feedback electrode(s) 4) for controlling a EMMTS feedback stimulus to a user.

The feedback control signal may be dependent upon the parameterized measurement output from the touch sensor arrangement 6 provided by the detector 70. Typically the feedback stimulus is provided at the same location at which the surface 12 is touched by a user. The nature of the stimulus may be dependent upon the nature of the touch. For example, the feedback control signal may be dependent upon any one or combination of the input parameters provided as measurement inputs 71 such as a position on the surface 12 that has been touched and/or a speed at which a touch position on the surface 12 travels and/or the pressure applied by a touch and/or the extent of deformation caused by the touch or touches and/or a contact (skin) impedance (Zc) and/or the size of the area that is touched. The EMMTS feedback control signal may be varied by controlling the potential difference as described above and in accordance with the nature and conditions of the touch.

FIG. 7 also illustrates the components of the apparatus 10 that provide EMMTS, namely one or more feedback electrodes 4A, 4B, 4C, and the grounding electrode 2 connected to a reference ground or earth. The method 50 may be simultaneously performed with respect to each of the feedback electrodes 4A, 4B, 4C.

The applied potential difference 24 at the or each feedback electrode 4 may have different output parameters and some or all of these may be varied. The parameters may include pulse amplitude H(t), offset potential, pulse width W(t), pulse density e.g. T(t) for a periodic signal, signal pattern (periodic signal, white uncorrelated noise, colored correlated noise, 1/f noise, noise spectral density of a random signal).

For example, the applied potential difference 24, may change to a pulse train with constant H(t), W(t) and T(t) or a pulse train with variable H(t) and constant W(t) and T(t) or a pulse train with variable T(t) and constant H(t) and W(t) or a pulse train with variable W(t) and constant H(t) and T(t) and a pulse train with all or any combination of the output parameters H(t), W(t) and T(t) varying.

A library of input parameter values may be stored in the controller 30 as vectors. Each parameter may represent a vector spanning a vector space. The values of the input parameters form a vector in the vector space and each vector may be associated with a collection of output parameters that control EMMTS feedback. When a measurement scenario occurs that has a particular vector of input parameters, the collection of output parameters that are associated with that vector in the library is used to control the form of EMMTS feedback.

The library may be adapted or augmented using training, where the output parameter values are varied to achieve a personalized EMMTS feedback and are then associated with a particular vector.

The controller 30 may also receive input 72 dependent upon the content displayed on the display 8 underlying the feedback electrode 4. The controller 30 may control the feedback control signal in dependence upon content displayed in the underlying display 8.

FIG. 5 schematically illustrates use of one example apparatus 10. In this example, the apparatus 10 is a hand-portable electronic apparatus 44. The user 40 holds the apparatus 10 using a hand 41. When held, the thumb 42 of the user's hand 41 contacts the grounding surface electrode 2 and the finger 43 of the user's same hand is positioned over a feedback electrode 4 and over the touch sensor arrangement 6 for discriminating different user contact locations. The user 40 is able to trace the tip of the finger 43 over the feedback electrode 4 while it is in contact with the feedback electrode 4. The touch sensor arrangement 6 detects the touch and the apparatus 10 responds appropriately. The controller 30 applies a time varying potential difference between the feedback electrode 4 and the grounding electrode 2 which the user perceives as 'texture' via EMMTS. The 'texture' may pre-exist the touch or may be in response to the touch.

The controller 30, by controlling the time variation in the potential difference, can convey feedback information to a user. Referring back to FIGS. 3A and 3B, for example, a change in the periodicity of the pulses 25 changes the periodicity of the 'texture' perceived at a user's digit using EMMTS.

In some embodiments, there may be a time division multiplexing between making measurements at the touch sensor arrangement 6 and providing EMMTS feedback. The use of time division multiplexing is particularly useful when a single component is used both for providing EMMTS feedback and for providing measurements. For example, as illustrated in FIG. 9, an electrode 4 used for EMMTS feedback may be used, when not used for EMMTS feedback, to measure a contact impedance or to detect proximity of a user or object.

Figure 9:
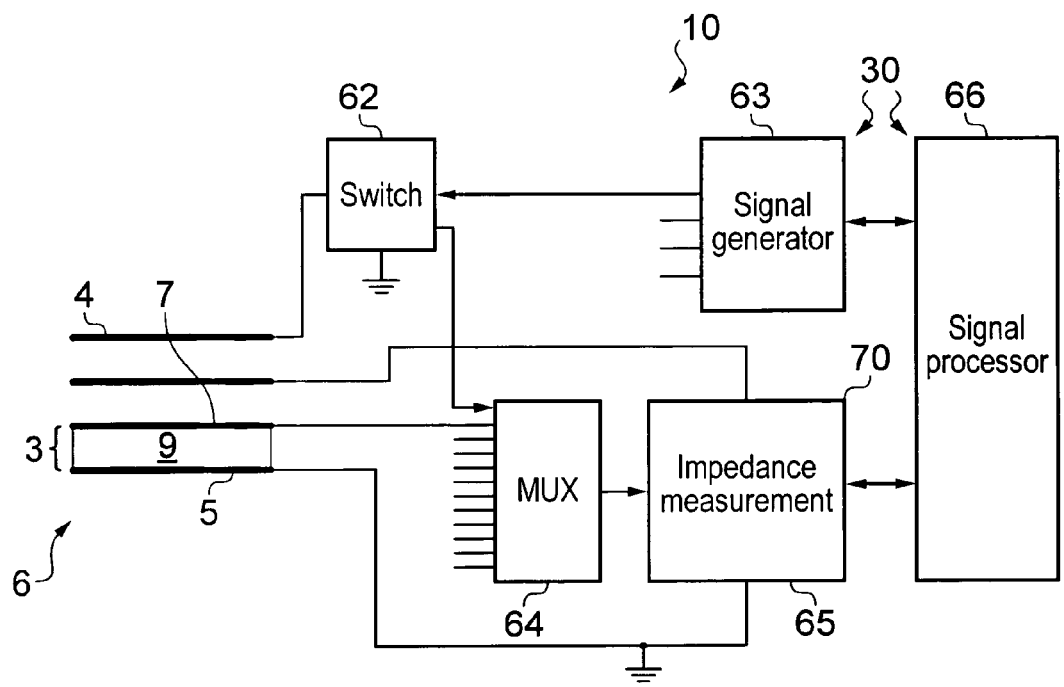
FIG. 9 schematically illustrates an embodiment where measurement is performed using an electrode that is also used for providing the touch stimulus.

FIG. 9 schematically illustrates an embodiment of the apparatus 10 where measurement is performed using an electrode that is also used for providing the touch stimulus.

The touch sensor arrangement 6 comprises a plurality of deformable capacitors 3 and also the electrode 4.

Each capacitor 3 has an electrode 5 and an electrode 7 separated by a deformable dielectric 9. When a touch input occurs at a capacitor 3, the resilient deformation of the deformable dielectric 9, causes the capacitance of the capacitor to temporarily change. By detecting the change in capacitance at each capacitor 3 using impedance measurement circuitry 65, it is possible to detect not only when and where a touch input has occurred but also to detect the deformation of the deformable dielectric 9 caused by the touch input.

The electrode 4 is used not only for providing a touch stimulus but also for proximity sensing and/or skin impedance measurement.

A switch 62 controls whether the electrode 4 is used for output (providing a touch stimulus) in which case it is connected to a signal generator 63 or for output (proximity sensing and/or skin impedance measurement) in which case it is connected to impedance measurement circuitry 65 which operates as detector 70.

In the illustrated embodiment, the impedance measurement circuitry 65 is shared between the M electrodes 4 and N deformable capacitors 3. The multiplexer is used to sequentially switch between the measurements made at the different components and select which measurement input is provided to the impedance measurement circuitry 65.

The impedance measurement circuitry 65 parameterizes the measurement inputs providing an impedance measurement parameter to signal processing circuitry 66, which processes the input parameters to produce output parameters (e.g. H(t), W(t), T(t)) that control the signal generator 63 to provide a feedback control signal (time varying potential difference to feedback electrode(s) 4) for controlling a EMMTS feedback stimulus to a user. The signal processing circuitry 66 and signal generator 63 operate, in combination, as controller 30.

The apparatus 10 may have a sleep mode and an active mode. In the sleep mode no EMMTS feedback is provided and the full range of measurements are not being made. However, the electrode 4 may be used for proximity detection which is detected as a change in impedance by impedance measurement circuitry 65. When the proximity of a user or object is detected, the apparatus 10 wakes up and enters the active mode in which the full range of measurements are made and the EMMTS feedback is provided in dependence upon those measurements.

Figure 10A:
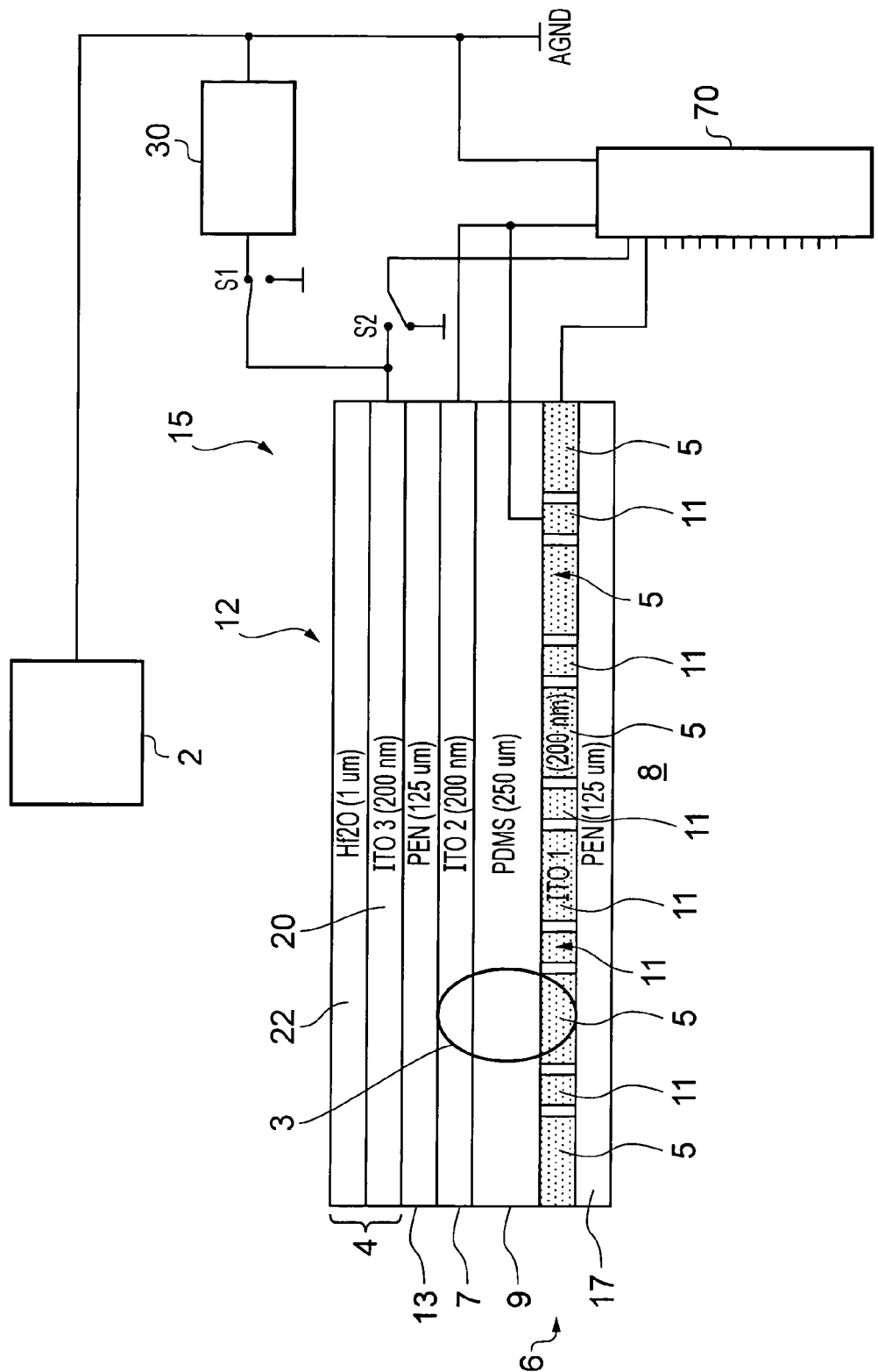
FIG. 10A schematically illustrates components of an example apparatus including a multi-layer structure.

FIG. 10A schematically illustrates components of one embodiment of the apparatus 10. In this example, the feedback electrode 4 is integrated with the touch sensor arrangement 6 in a multi-layer structure 15. The multi-layer structure may be transparent and deformable and it may overlie a flexible display 8.

Figure 6:
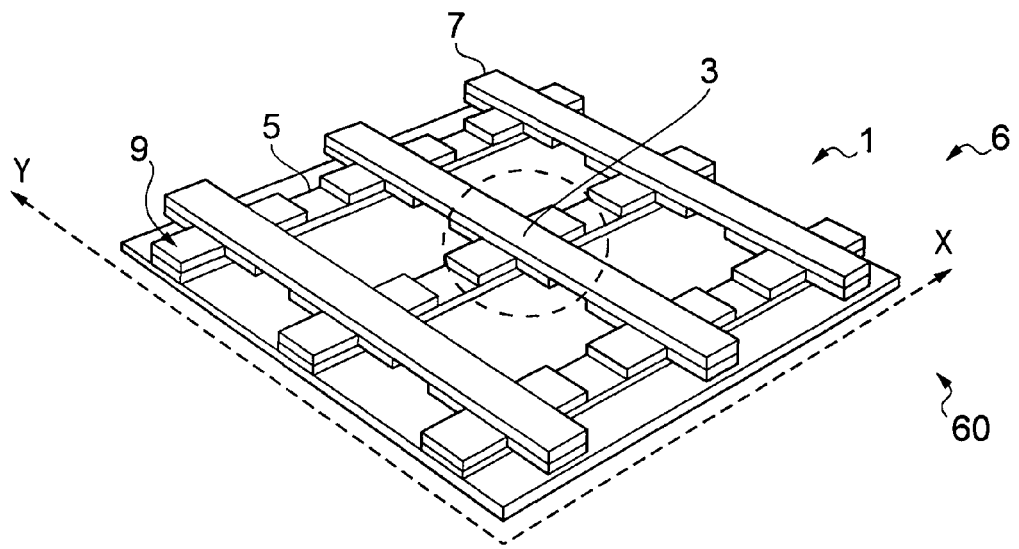
FIG. 6 schematically illustrates an example of a touch sensor arrangement.

In this illustrated example the multi-layer structure comprises a dielectric substrate 19 which supports the touch sensor arrangement 6 as illustrated in FIG. 6. The row electrodes 5 extend into the page, so that we can see a number of them in transverse section in the Figure. The column electrodes 7 extend across the page, so that we can see one of them in longitudinal section in the Figure. Conductive guard strips 11 are interposed between neighboring row electrodes 5 and neighboring column electrodes 7. The row electrodes 5 and the column electrodes are separated by a deformable dielectric 9.

A dielectric layer 13 separates the touch sensor arrangement 6 from the overlying feedback electrode 4. The feedback electrode comprises a conductive layer 20 and an overlying dielectric layer 22 as previously described.

The dielectric layer 17 and the dielectric layer 13 may be flexible and transparent. They may each be formed from a layer of polyester such as, for example, Polyethylene naphthalate (PEN) with, for example, a thickness of 125 microns.

The deformable dielectric layer 9 may be flexible and transparent. It may be formed from a layer of silicone such as, for example, Polydimethylsiloxane (PDMS) with, for example, a thickness of 250 microns.

The electrode layers 5, 7, 20 may be flexible and transparent. They may, for example, be formed from a layer of indium tin oxide with, for example, a thickness of 200 nm, or realized by a network of dispersed CNT (carbon nano tubes) or silver nano wires. They may also be composed of graphene sheets.

The guard strips 11 may be flexible and transparent. They may be formed from a layer of indium tin oxide with, for example, a thickness of 200 nm.

In this example, the detector 70 is a capacitance to digital detector such as the capacitance to digital converter AD7147 (Analog Devices). The detector 70 has its ground terminal connected to ground (GND), its ACshield terminal connected to the column electrodes 7 and the guard strips 11 and an input terminal connected to the row electrodes 5. Circuitry, not illustrated, selectively connects each pairing of row electrode 5 and column electrode 7 to the detector 70 in a sequential fashion.

In this example, the feedback electrode 20 is connected to the controller 30 via switch S1 and to the detector 70 via switch S2. When switch S1 is closed, switch S2 is open and when switch S1 is open, switch S2 is closed.

When switch S1 is closed, the feedback electrode 4 operates as an EMMDS electrode.

When switch S2 is closed, the feedback electrode 4 operates as a proximity or touch detector. The change in capacitance caused by, for example, a digit approaching or touching the surface 12 can be detected by the detector 70. Thus the feedback electrode 4 can additionally operate as a touch sensitive arrangement when the switch S2 is closed. In some embodiments, the apparatus 10 may be controlled in dependence upon the proximity/touch detection. For example, an illumination level on the display 8 may be adjusted by, for example, turning it on when a proximity detection occurs which would save energy.

The system may also have a sleep mode and an active mode. In the sleep mode no EMMTS feedback is provided and the full range of measurements are not being made. However, the electrode 4 may be used for proximity detection. When the proximity of a user or object is detected, the system wakes up and enters the active mode in which the full range of measurements are made and the EMMTS feedback is provided in dependence upon those measurements.

The use of time division multiplexing is particularly useful when a single component, such as the electrode 4, is used both for providing EMMTS feedback and for providing measurements, such as proximity measurements or contact impedance measurements.

Although in FIG. 10A, the column electrodes 7 are illustrated as connected to the ACshield terminal of the detector 70, in other embodiments they may be connected to ground GND.

Figure 10B:
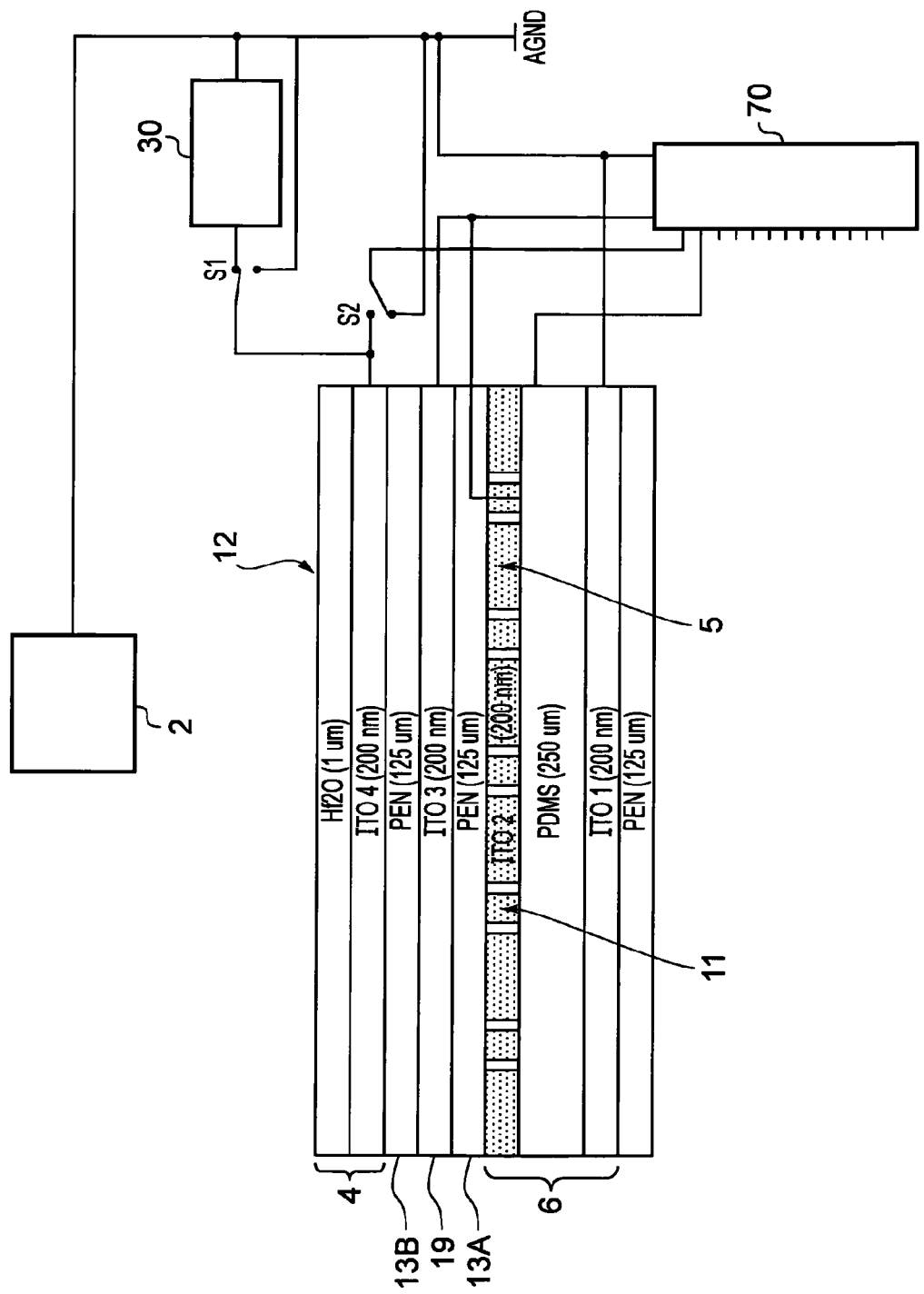
FIG. 10B schematically illustrates components of an example apparatus including an alternate multi-layer structure.

FIG. 10B schematically illustrates an arrangement similar to that illustrated in FIG. 10A. It additionally comprises instead of the dielectric layer 13, a conductive layer 19 sandwiched between two dielectric layers 13A and 13B. The conductive layer may be connected to the ACshield terminal of the controller 70. The conductive layer 19 electrically separates the feedback electrode 4 from the array of capacitors 3.

The dielectric layers 13A, 13B may be flexible and transparent. They may each be formed from a layer of polyester such as, for example, Polyethylene naphthalate (PEN) with, for example, a thickness of 125 microns.

The conductive layer 19 may be flexible and transparent. It may be formed from a layer of indium tin oxide with, for example, a thickness of 200 nm.

Figure 10C:
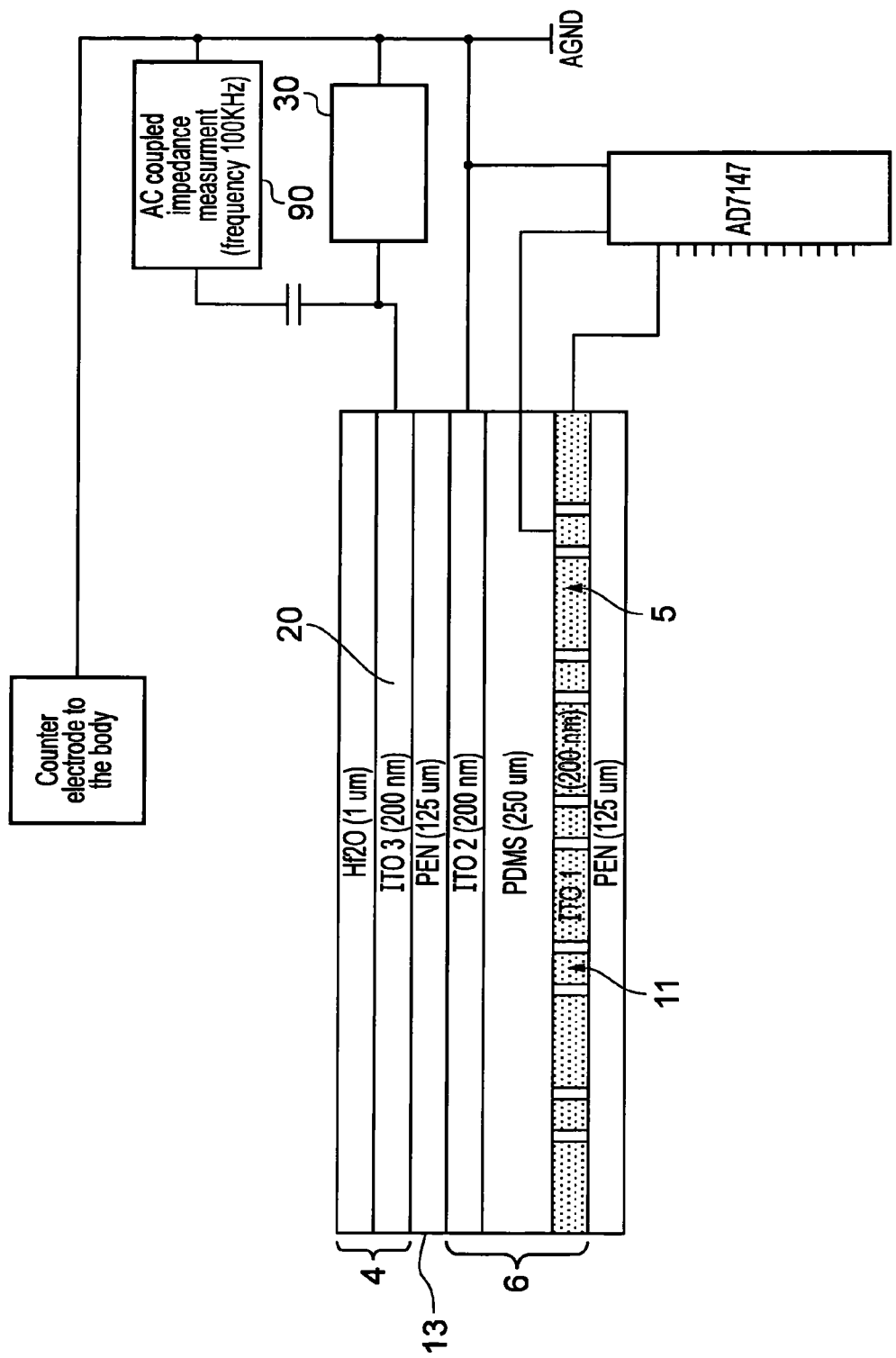
FIG. 10C schematically illustrates components of another example apparatus.

FIG. 10C schematically illustrates an arrangement similar to that illustrated in FIG. 10A. However, it does not comprise switches S1 and S2. It additionally comprises touch contact impedance measurement circuitry 90 connected via a capacitor 92 to the conductive layer 20 of the feedback electrode 4. The impedance measurement circuitry 90 is ac coupled and operates at high frequency range (>100 kHz).

The controller 30 may be implemented using instructions that enable hardware functionality, for example, by using executable computer program instructions in a general-purpose or special-purpose processor that may be stored on a computer readable storage medium (disk, memory etc) to be executed by such a processor.

Figure 11:
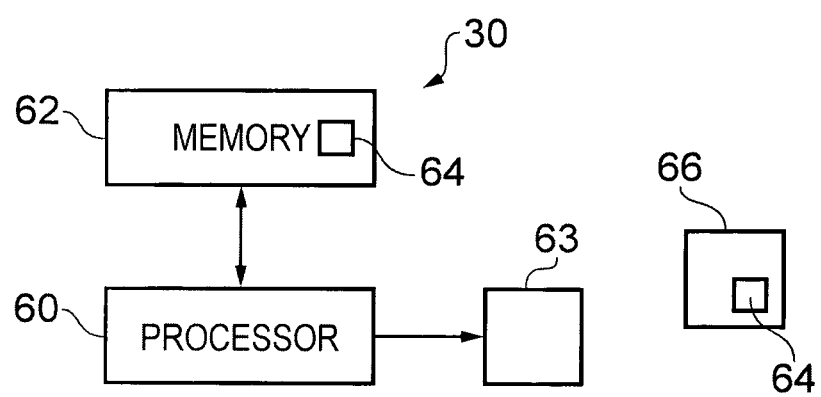
FIG. 11 schematically illustrates an example of one implementation of a controller for the apparatus.

FIG. 11 schematically illustrates an example of one implementation of a controller for the apparatus. The controller 30 comprises a processor 60 and a memory 62. It also comprises a signal generator 63 controlled by the processor 60 to apply different time varying potential differences across one or more feedback electrodes and the reference electrode.

The processor 60 is configured to read from and write to the memory 62. The processor 60 may also comprise an output interface via which data and/or commands are output by the processor 60 and an input interface via which data and/or commands are input to the processor 60.

The memory 62 stores a computer program 64 comprising computer program instructions that control the operation of the controller 30 when loaded into the processor 60. The computer program instructions 64 provide the logic and routines that enables the apparatus to perform the methods illustrated in FIG. 7. The processor 60 by reading the memory 62 is able to load and execute the computer program 64.

The computer program may arrive at the controller 30 via any suitable delivery mechanism 66. The delivery mechanism 66 may be, for example, a computer-readable storage medium, a computer program product, a memory device, a record medium such as an article of manufacture that tangibly embodies the computer program 64. The delivery mechanism may be a signal configured to reliably transfer the computer program 64.

Although the memory 62 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc.

should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The controller 30 may be provided as a module. A feedback electrode may also be provided as a module. A reference electrode may also be provided as a module. As used here 'module' refers to a unit or apparatus that excludes certain parts/components that would be added by an end manufacturer or a user.

It will be appreciated from the foregoing that the apparatus 10 may be a deformable apparatus and the multilayer structure 15 comprising the feedback electrode 4 and the touch sensor arrangement 6 may define a two-dimensional planar surface 12 or may be contorted to define a three dimensional surface 12. In some embodiment, the apparatus 10 may be deformed by a user into an "arbitrary shape". The touch sensor arrangement 6 is configured to detect complex deformations such as a grasp, a squeeze, a twist, a flex, a press with 1 to 5 fingers, holding in the palm of a user's hand etc. As a result of the deformation of, for example the capacitors 3, the controller 70 can generate a surface deformation vector D($\Delta$x, $\Delta$y,$\Delta$z) representing a map of localised deformations as result of the user interaction with the apparatus.

Each map of localised deformations may, for example, be associated with a different user input command. It may also be associated with a different type of EMMTS stimulus provided by the controller 30.

FIG. 6 schematically illustrates an example of a touch sensor arrangement 6 or part of a touch sensor arrangement 6. The illustrated touch sensor arrangement 6 comprises an array 1 of capacitors 3 arranged in rows and columns. The array 1 is positioned parallel to the surface 12 of the body 11 of the apparatus 10. Each capacitor 3 in a row shares a common row electrode 5 and each capacitor in a column shares a common column electrode 7. The electrodes are separated by a deformable dielectric 9. When a touch input occurs at a capacitor 3, the resilient deformation of the deformable dielectric 9, causes the capacitance of the capacitor to temporarily change. By sequentially detecting the change in capacitance at each capacitor 3, it is possible to detect not only when and where a touch input has occurred but also to detect the deformation of the deformable dielectric 9 caused by the touch input.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
   a body portion having a surface;
   at least one feedback electrode configured to provide a time varying feedback stimulus to a digit of a user that is traced across the feedback electrode;
   and a touch sensor arrangement for discriminating different user contacts on the surface;
   wherein the time varying feedback stimulus is provided by an applied time varying potential difference by modulating a frictional force applied to the digit of the user when the digit, contacting the surface, is traced across the surface.

2. An apparatus as claimed in claim 1, wherein the surface is a deformable surface.

3. An apparatus as claimed in claim 1, wherein the feedback electrode, and the touch sensor arrangement form a transparent deformable multi-layer structure.

4. An apparatus as claimed in claim 1, further comprising a display underlying the feedback electrode and the touch sensor arrangement, wherein each of the feedback electrode, and the touch sensor arrangement are transparent.

5. An apparatus as claimed in claim 1, wherein the touch sensor arrangement comprises deformable capacitor sensors each comprising a pair of deformable electrodes and a resiliently deformable dielectric.

6. An apparatus as claimed in claim 1, wherein the touch sensor arrangement comprises an array of capacitors arranged in rows and columns, wherein each capacitor in a row shares a common electrode and each capacitor in a column shares a common electrode.

7. An apparatus as claimed in claim 5, further comprising a detector for detecting a change in capacitance of the touch sensor arrangement.

8. An apparatus as claimed in claim 1, wherein the touch sensor arrangement comprises as an electrode the feedback electrode.

9. An apparatus as claimed in claim 8, further comprising at least one switch for controlling whether the electrode is used for touch sensing or feedback.

10. An apparatus as claimed in claim 1, wherein the touch sensor arrangement is configured to operate as a proximity detector.

11. An apparatus as claimed in claim 1, wherein the touch sensor arrangement is configured to operate as a contact impedance detector.

12. An apparatus as claimed in claim 1, further comprising a controller configured to provide a feedback control signal for controlling a feedback stimulus to a user wherein the feedback control signal is dependent upon output from the touch sensor arrangement.

13. An apparatus as claimed in claim 12, wherein the feedback control signal is dependent upon one or more of:
   a contact location,
   a manner of contact at the contact location,
   an amount of force applied at the contact location,
   an area over which a force is applied at the contact location,
   a contact impedance at the contact location,
   a speed at which the digit is traced across the feedback electrode, content displayed in an underlying display.

14. An apparatus as claimed in claim 12, wherein the controller is configured to apply the time varying potential difference between the feedback electrode and a surface electrode and is configured to control at least the time variation in the potential difference.

15. An apparatus as claimed in claim 14, wherein the controller is configured to apply a periodic potential difference between the surface electrode and the feedback electrode.

16. An apparatus as claimed in claim 15, wherein the controller is configured to vary the periodicity of pulsed stimulating patterns including variation of amplitude (H), duration (W) and periodicity (T) of principal stimulating pulses.

17. An apparatus as claimed in claim 1, wherein the feedback electrode comprises a conductive layer and an exterior dielectric layer, wherein the exterior dielectric layer is transparent.

18. A method comprising:
 discriminating different touches on a touch surface by a user; and
 providing a time varying feedback stimulus to a digit of a user that is traced across a feedback electrode;
 wherein the time varying feedback stimulus is provided by an applied time varying potential difference by modulating a frictional force applied to the digit of the user when the digit, contacting the surface, is traced across the surface.

19. A method as claimed in claim 18, comprising:
 controlling the feedback stimulus in response to a touch in dependence upon the discrimination of the touch.

20. A method as claimed in claim 18, wherein the feedback stimulus is dependent upon one or more of:
 the contact location,
 a manner of contact at the contact location,
 an amount of force applied at the contact location,
 an area over which a force is applied at the contact location,
 a contact impedance at the contact location,
 a speed at which a touch position on the surface travels.

* * * * *